(12) United States Patent
Gentry et al.

(10) Patent No.: US 7,620,606 B2
(45) Date of Patent: Nov. 17, 2009

(54) METHOD AND APPARATUS FOR SECURE AND SMALL CREDITS FOR VERIFIABLE SERVICE PROVIDER METERING

(75) Inventors: Craig B. Gentry, Mountain View, CA (US); Zulfikar Amin Ramzan, San Mateo, CA (US)

(73) Assignee: NTT Docomo, Inc., Tokyo (JP)

( * ) Notice: Subject to any disclaimer, the term of this patent is extended or adjusted under 35 U.S.C. 154(b) by 653 days.

(21) Appl. No.: 10/534,943

(22) PCT Filed: Feb. 6, 2004

(86) PCT No.: PCT/US2004/003438

§ 371 (c)(1),
(2), (4) Date: May 13, 2005

(87) PCT Pub. No.: WO2005/027008

PCT Pub. Date: Mar. 24, 2005

(65) Prior Publication Data

US 2007/0005499 A1    Jan. 4, 2007

Related U.S. Application Data

(66) Substitute for application No. 60/502,025, filed on Sep. 10, 2003.

(51) Int. Cl.
  *G06Q 99/00*    (2006.01)
(52) U.S. Cl. ............... 705/76; 705/50; 705/64; 705/65; 713/150; 380/277

(58) Field of Classification Search .......... 705/50, 705/64–79
See application file for complete search history.

(56) References Cited

U.S. PATENT DOCUMENTS

| | | | | |
|---|---|---|---|---|
| 4,309,569 A | * | 1/1982 | Merkle | 713/177 |
| 6,339,765 B1 | * | 1/2002 | Maher | 705/41 |
| 2001/0034839 A1 | | 10/2001 | Karjoth et al. | |
| 2001/0037250 A1 | | 11/2001 | Lefkowitz | |
| 2003/0061170 A1 | * | 3/2003 | Uzo | 705/64 |

OTHER PUBLICATIONS

G. Ateniese, et al., "A Practical and Provably Secure Coalition-Resistant Group Signature Scheme"; CRYPTO2000, vol. 1880 of Lecture Notes in Computer Science ACM SIGARCH Computer Architecture News, 16 pgs.

* cited by examiner

*Primary Examiner*—Jalatee Worjloh
(74) *Attorney, Agent, or Firm*—Blakely, Sokoloff, Taylor & Zafman LLP

(57) ABSTRACT

A method and apparatus for obtaining access to services of service providers. In one embodiment, the method comprises requesting a desired service through a foreign service provider. (101), generating a hash tree and generating a digital signature on a root value of the hash tree (102), sending the digital signature and the root value to the foreign service provider (103), providing one or more tokens to the foreign service provider with the next packet if the foreign service provider accepts the signature (105) and continuing to use the service while the foreign service provider accepts token (107).

22 Claims, 9 Drawing Sheets

METHOD AND APPARATUS FOR SECURE AND SMALL CREDITS FOR VERIFIABLE SERVICE PROVIDER METERING

PRIORITY

The present patent application is a National Phase Application of International Application No. PCT/US2004/003438, filed Feb. 6, 2004, which claims priority to the corresponding Provisional patent application Ser. No. 60/502,025, entitled, "Method and Apparatus for Secure and Small Credits," filed on Sep. 10, 2003, and incorporated herein by reference. The present application claims priority to both International Application No. PCT/US2004/003438, filed Feb. 6, 2004, and Provisional patent application Ser. No. 60/502,025, Sep. 10, 2003.

FIELD OF THE INVENTION

The present invention relates to the field of accounting mechanisms for use in conjunction with network communications; more particularly, the present invention relates to accounting mechanisms in which the accuracy of the accounting is secured efficiently and cryptographically.

BACKGROUND OF THE INVENTION

Consider, as a motivating example, a service provider that wishes to partner with other service providers in order to provide a richer set of services to its customers. If company A is providing Internet access service through its own network, then its customers are typically limited to accessing such an Internet service from company A's network. However, it might make sense from a business perspective for company A to partner with company B, which also provides Internet access via a network. The partnership may include an agreement whereby company B agrees to provide service to company A's customers, as long as company A provides appropriate reimbursement to company B (e.g., from company A's proceeds from appropriately billing the customers that used company B's network). Company A may agree to provide a similar service to company B's customers.

However, a number of problems arise when trying to implement such an arrangement. First, company A must get accurate accounting information, so that it can bill its customers appropriately. Second, company B must not be able to cheat by overstating usage of its network by company A's customers. Third, company A's customers should not be able to get any free access to company B's network. Therefore, the accounting mechanism should account for all customer usage.

Prior art solutions to these problems create significant additional costs. These additional costs are not only monetary, but may be considerable in terms of the amount of computation time, computer memory, and/or electrical power required by the devices owned by the various parties, These factors may be especially important when the customers are using mobile devices, which may have severe computational, memory and power constraints.

To the best of our knowledge, there is no prior art for methods, systems, or components for handling the situations discussed above with sufficient efficiency.

One naive solution is to use a micropayment scheme, in which a "bank generates "coins" for its customers, which they can spend to pay for services provided by various merchants. The user pre-pays for these coins, and the system is debit-based. If an Internet service is being accessed, for example, the user can Include one coin with every packet of data it sends over the foreign service provider's (FSP's) network. The FSP is provided with a mechanism for validating these coins. After validating a coin, the FSP may transmit the corresponding packet. Ultimately, the FSP provides all of these coins to the home service provider (HSP) so that the FSP can be reimbursed. The electronic payment system is secure in the sense that only the HSP can create valid electronic coins that no other party can forge.

This naive solution has a number of drawbacks. First of all, the solution does not scale well for the HSP. The HSP must generate all of the electronic coins used by its customers and securely transport those coins to each end user. If, as in the above example, a coin is used for every packet that a customer transmit over an FSP, then the number of coins that the HSP must generate is proportional to the entire volume of traffic that its customers impose on the FSP. This volume may be very significant, and it may be impractical for a single centralized server of the HSP to generate sufficient coins.

Second, the HSP has to handle verifying each coin when it is returned. The two possible ways that the HSP might do this are to maintain a list of every coin it issued or perform the same verification step as the FSP. In either case, the computation is again proportional to the total number of coins used by its customers, and this computation may therefore be infeasible. In the first case, the amount of storage necessary to store a huge table of all possible coins might be prohibitively expensive. In the second case, though less storage-intensive, it is more CPU-intensive, as performing the verification step like the FSP is slower than a table lookup.

SUMMARY OF THE INVENTION

A method and apparatus for obtaining access to services of service providers. In one embodiment, the method comprises requesting a desired service through a foreign service provider, generating a hash tree and generating a digital signature on a root value of the hash tree, sending the digital signature and the root value to the foreign service provider, providing one or more tokens to the foreign service provider with the next packet if the foreign service provider accepts the signature and continuing to use the service while the foreign service provider accepts tokens.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Embodiments of the present invention include methods, components and systems allowing a home service provider (HSP) to partner with a foreign service provider (FSP) and receive accurate accounting information from a customer of the home service provider who uses the service provided by the foreign service provider. The methods, components, and systems relate to a secure accounting scheme that is efficient for all parties and that scales well for the HSP.

In one embodiment of the present invention, the user (U) in a microcredit scheme can efficiently create microcredit tokens that can later be tied back to him and only him; i.e. the tokens cannot be generated by anyone else besides him. Preferably, the user possesses a public key/private key pair, which has preferably been certified either by the HSP or some trusted third party, and uses its private key to digitally sign multiple microcredits that is has generated. The certificate that is obtained by the user from the HSP or other trusted third party preferably includes a digital signature that "binds together", in a verifiable fashion, various attributes related to the user such as the user's name, public key, and the services it is authorized to use, as well as other attributes such as the intended validity period of the certificate. In one embodiment, the user furnishes one or more tokens to the FSP at a time, and the FSP, after or while validating the tokens (as well as, preferably, the certificate), provides user with a quantity of goods or services corresponding to the value of the coins.

In another embodiment, the FSP transmits to the HSP the tokens that it has received from the HSP's customers. Preferably, the FSP receives reimbursement from the HSP based on the value of the tokens. The FSP may first aggregate the tokens, so that the FSP's storage of the tokens requires reduced memory, and so the bandwidth of the transmission to the HSP is reduced. For example, the FSP may store and/or transmit only the last token received from the customer, and any ancillary information needed to validate the token.

Figure 9:
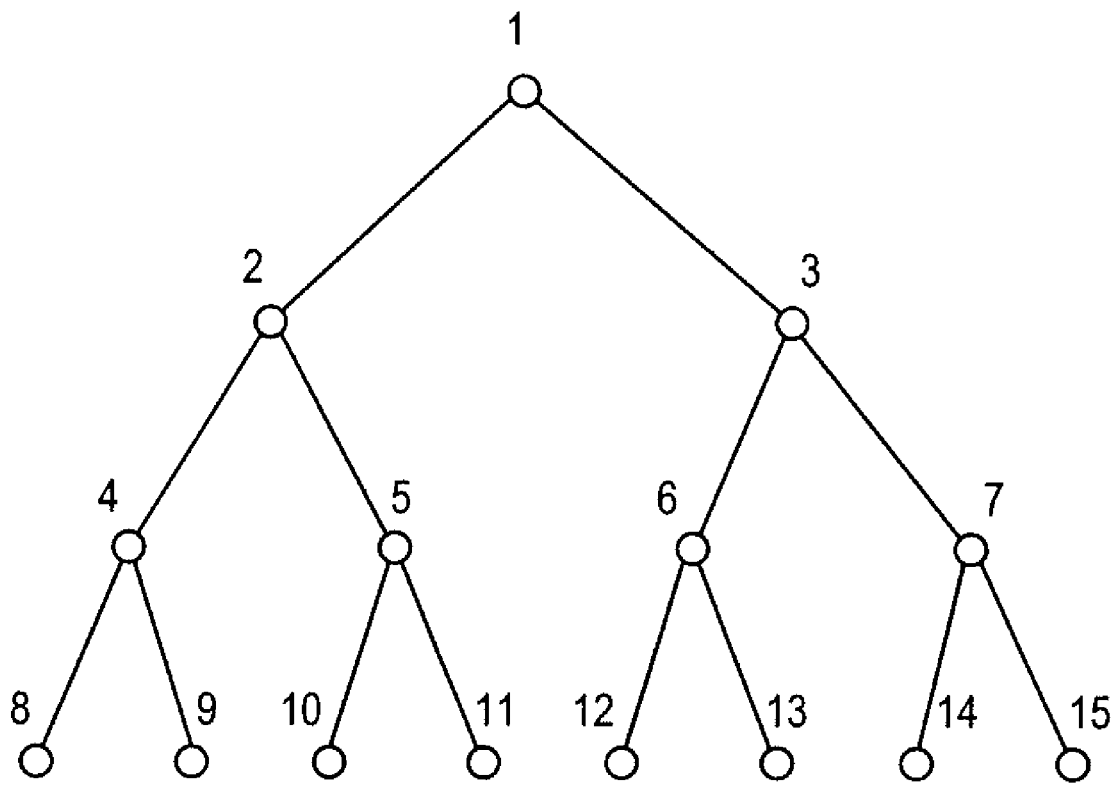
FIG. 9 is an exemplary tree.

FIG. 9 is an exemplary tree. Note that if only the last token and the co-nodes are stored, then the user device may need to transmit additional into to help with the verification process. FIG. 9 illustrates this point. Referring to FIG. 9, node 3 is a co-node for the tokens corresponding to nodes 2, 4, 5, 8, 9, 10, 11. If, after receiving node 6, the FSP only keeps its co-nodes (7, 2), then when node 8 is used, the user submits node 3 again.

Alternatively, the FSP may not even store the information needed to validate the token, if the burden of proof is on the customer to prove that the token cannot be valid. Alternatively, the FSP may store and/or transmit only a small percentage of the tokens, which, in the style of a "lottery", may be reimbursed by the HSP at more than their original expected value.

In another embodiment, the HSP receives tokens from the FSP, and uses these tokens to determine the appropriate accounting with its customers. Preferably, the HSP validates tokens upon receiving them from the FSP and applies a charge to the appropriate user's billing statement commensurate with the number of microcredit tokens spent by the user. In accordance with embodiments of the present invention, each microcredit token incorporates a mechanism for determining how many such tokens have been already used (and if that number is incorrectly specified, then the check for validity will fail). The HSP may store the tokens together with any ancillary information needed to verify them. Alternatively, the HSP may not store the information needed to validate the token, if the burden of proof is on the customer to prove that the token cannot be valid. Alternatively, the HSP may validate and/or store only a small percentage of the tokens, which, in the style of a "lottery", may be reimbursed by the HSP to the FSP at more than their original expected value. In one embodiment, the work needed by the HSP to verify the coins used by a customer during a session with an FSP is not proportional to the total number of coins used, as in micropayment schemes, but is instead proportional to the logarithm of the number of coins.

In another embodiment, the user may generate its microcredit tokens using a dense hash tree. Dense hash trees, which are described in detail in connection with the various embodiments, allow further reduction of the storage, computation and transmission that are needed for token verifiability.

Embodiments of the present invention are able to achieve efficiency for all parties and scalability for the HSP in part because the system is credit-based rather than debit-based (where the customer, in effect, generates its own coins), and in part because of the efficient data structures that are employed. The result is a secure, accurate (preventing inflation or deflation) and efficient accounting mechanism widely applicable to provision of goods or services.

Thus, embodiments of the solution for use among the home service provider (HSP) (company A), the foreign service provider (FSP) (company B) and the customers of the HSP has a number of properties. First, with respect to the HSP-customer relationship, the technique leaves evidence or otherwise indicates how much the HSP should bill the customer. Second, with respect to the HSP-FSP relationship, the technique leaves evidence or otherwise indicates how much the FSP should bill the HSP. Third, with respect to the FSP-customer relationship, the accounting mechanism provides a mechanism by which the customer can access services from the FSP only when it provides the FSP with the accounting evidence needed for the previous two relationships. Lastly, the underlying accounting mechanisms are efficient, and, thus, are not a barrier to using the FSP's services.

The evidence is such that it can be used to enforce accurate billing among all of the parties: the FSP is not be able to overstate usage of its resource's by the HSP's customers; the HSP is not be able to overstate what a customer owes it (for its use of either the HSP's resources or the FSP's); and the customer is not be able to disavow its accounted-for usage of the resources.

Such an accounting mechanism, if efficient enough, would have numerous applications, including the secure provision of third-party services over the Internet—e.g., the secure provision of and payment for multimedia streams like digital movies or music.

The accounting mechanism described herein solves the above problems. In one embodiment, the accounting mechanism does not create such significant additional costs that the solution itself becomes a barrier to successful implementation of the partnership.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, color or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Preliminaries

Model and Notation

In the model used herein, a home service provider (HSP), a foreign service provider (FSP), and a user (U) are included. Note that use of the term "user" may refer to an individual or the user's client device. The existence of an open or closed public-key infrastructure is assumed, and both HSP and the user have public-private key pars. A key pair is referred to as (Sk, Pk), where Sk is the private signing key for computing the signature on a message, and Pk is the public verification key corresponding to the Sk. The Sign(Sk, M) denotes the algorithm that outputs a signature s on message M under the signing key Sk, and Vf(Pk, M, σ) denote the verification algorithm. For clarity, subscripts are used to denote keys that belong to specific individuals. Therefore, the key pair for the HSP is $(Pk_{HSP}, Sk_{HSP})$ and the key pair for the user is $(Pk_U, Sk_U)$.

Let $\{0, 1\}^*$ denote the set of all bit strings. For a bit string s, its length is denoted by $|s|$. H denotes a cryptographic compression function that takes as input a b-bit payload as well as a v-bit initialization vector or IV, and produces a v-bit output. It is assumed that $b \geq 2v$, which holds for all well-known constructions in use. For the constructions described herein, typically $b=2v$. It is assumed these cryptographic compression functions are collision resistant; that is, finding two distinct inputs $m_1 \neq m_2$ such that $H(IV, m_1)=H(IV, m_2)$ is difficult. It is assumed that the IV is fixed and publicly known. For notational simplicity, the IV is not always explicitly listed herein as an argument in the hash function. Practical examples of such cryptographic compression functions are found in SHA-1 or MD5. The compression function in the former has an output and IV size of 20-bytes, whereas for the latter, the size is 16-bytes. Both have a 64-byte payload size. The schemes used in the techniques herein do not operate on data larger than the compression function payload; however, there are numerous standard techniques such as iterated hashing or Merkle-trees for doing so.

For a length-preserving function $f: \{0,1\}^n \to \{0,1\}^n$ and an integer $i \geq 1$, let $f^i$ denote its f-fold composition. That is, $f^i(x)=f(x)$ for $i=1$ and $f^k(x)=f(f^{k-1}(x))$ for $i>1$. The function $f$ is a one-way function if given $f(x)$, where x is randomly chosen, it is hard to find a pre-image z such that $f(z)=f(x)$, except with negligible probability. A one-way function $f$ is said to be one way on its iterates if for any i, given $f^i(x)$, it should be hard to find a pre-image z such that $f(z)=f(x)$, except with negligible probability. In practice, one often constructs a candidate function that is one way on its iterates by starting with a hash function H and padding part of the payload to make it length preserving.

Finally, for a real number r, $\lceil r \rceil$ is set to be the ceiling of r, that is, the smallest integer value greater than or equal to r. Similarly, $\lfloor r \rfloor$ denotes the floor of r, that is, the largest integer value less than or equal to r.

Merkle Trees

A Merkle tree can be described as follows. Suppose that there are m values $x_1, \ldots, x_m$ each of which is in $\{0,1\}^n$. For simplicity, assume that m is a power of 2. Let H: $\{0,1\}^{2n} \to \{0,1\}^n$ be a cryptographic hash function that maps 2n-bits to n-bits. The Merkle tree associated with $x_1, \ldots, x_m$ under hash function H is a balanced binary tree in which each node is associated with a specific value Value(v). There are m leaves, and for each leaf i, $Value(l_i)=x_i$, $1 \leq i \leq m$. For an interior vertex v, let $C_0(v)$ and $C_1(v)$ denote its left and right children. Let o denote the concatenation operation. Then, $$Value(v)=H(IV, Value(C_0(v)) \circ Value(C_1(v))).$$

Merkle trees may be used to digest data in digital signatures, where the signed digest corresponds to the value associated with the root. Also, if the underlying compression function is collision resistant, then it is difficult to find two different messages whose Merkle root value is identical.

Dense Hash Trees

One embodiment of a method for setting up dense hash trees is described. These look like Merkle trees except that some of the interior vertices are numbered. Again starting with m values, $x_1, \ldots, x_m$, for simplicity, suppose that m is equal to $2^k$ for some positive integer k. As is done in a Merkle Tree, a balanced binary tree of depth k+1 is constructed and values are assigned to each of the vertices as follows. For each leaf, a random n-bit value is assigned. Now, let H: $\{0, 1\}^{2n} \to \{0, 1\}^n$ be a cryptographic hash function. Then, for any interior node v, Value(v)=H(IV, Value($C_0$(v)) o Value($C_1$(v))). Next, the following two-coloring is applied to the nodes in the tree. The root is colored white. The left child of the root takes the color grey and the right child of the root takes the color white. Working our way down the tree where for every vertex, it is colored grey if it is a left child of its parent or we color it white if it is a right child of its parent. Finally, the grey nodes are numbered in a breadth-first manner. That is, starting at the top of the tree, and working down to each sequential level, each gray node is numbered sequentially from left to right.

For example, the number one is assigned to the left child of the root. The number two is assigned to the left child of the left child of the root. The number three is assigned to the left child of the right child of the root. The number four is assigned to the left child of the left child of the root. The number five is assigned to the left child of the right child of the left child of the root. The number six is assigned to the left child of the left child of the right child of the root. The number seven is assigned to the left child of the right child of the right child of the root, and so on.

Figures 7A, 7B:
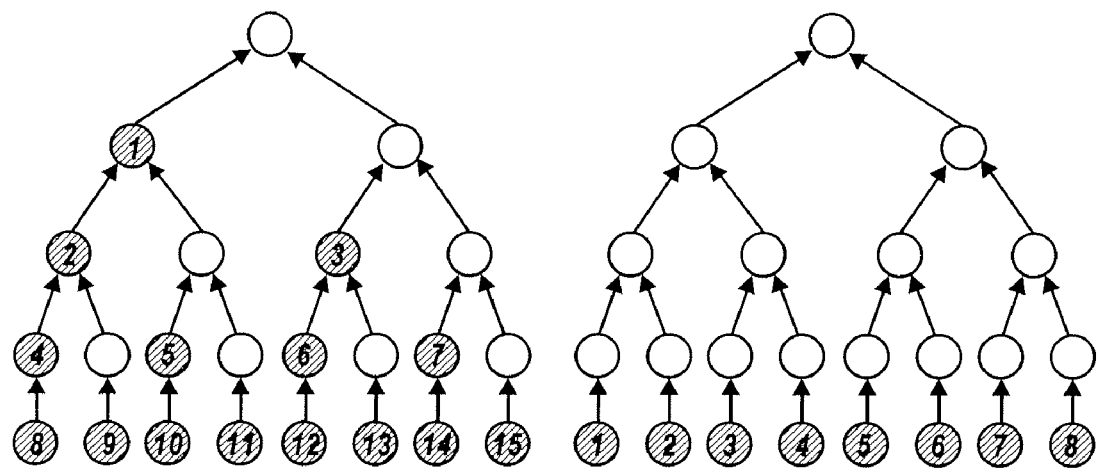
FIGS. 7A and 7B are an exemplary dense hash tree and an exemplary Merkle tree.

The $i^{th}$ gray vertex by gv(i). FIGS. 7A and 7B provide an example of a 23-vertex dense hash tree that can be used for 15 microcredit transactions; each interior node is assigned a value equal to the hash of its childrens' values. Each left child is numbered sequentially top-down, left to right. FIG. 7B is an exemplary 23-vertex Merkle tree. The basic part of the tree has 15 vertices; but 8 additional implicit vertices hang off the bottom. This tree can only be used for 8 microcredit transactions. By using interior vertices, we achieve almost twice as many microcredit transactions for the same size tree, yielding an overall efficiency improvement.

The notion of the co-nodes for a given vertex in a dense hash tree is used. For a vertex v, CoNodes(v) is the set of siblings of the vertices on the path from v to the root. More formally, if Sib(v) and Parent(v) denote v's sibling and parent respectively, then:

$$CoNodes(v) = \begin{cases} 0 & \text{if } v \text{ is the root} \\ \{Sib(v)\} \cup CoNodes(\text{Parent}(v)) & \text{otherwise.} \end{cases}$$

Finally, for a set of co-nodes, Value(CoNodes(v)) denotes the values associated with the co-nodes of a vertex v.

Given the co-nodes, one embodiment of a process for calculating the root value is as follows. Suppose that the value associated with the $i^{th}$ grey vertex is v and suppose that the values of siblings of all the vertices on the path from the $i^{th}$ grey vertex to the root vertex are $v_1, \ldots, v_l$. Then, the root value can be calculated as hl where $h_1 = H(v \circ v_1)$ and $h_i = H([h_{i-1}, v_i])$ where $[h_i, v_i]$ equals $v_i \circ h_i$ if $v_i$ is a left child or $h_i \circ v_i$ if $v_i$ is a right child.

Although the one way of enumerating a dense hash tree is provided above, any enumeration in which every parent node comes before its children nodes may be used. The $k^{th}$ microcredit, in this case, consists of the children of the $k^{th}$ enumerated node, along with the co-nodes of the $k^{th}$ node. Any such enumeration retains the benefit of unit transmission cost for the user and unit verification cost for the FSP. However, another enumeration may result in the $k^{th}$ microcredit having a verification path is longer than log(k). Numbering the nodes according to a pre-order traversal allows a very favorable memory-computation tradeoff when "traversing" the tree. (Tree traversal involves a tradeoff between the amount of tree information that the user stores in its cache after computing the $(k-1)^{th}$ microcredit, and the amount of computation it needs to compute the $k^{th}$ microcredit from this cached information.) In fact, the tradeoff is better than the best tradeoff found so far for Merkle trees. The reason is that dense hash trees, unlike Merkle trees, make full use of internal nodes. For a tree in which computing the root node value requires n hashes, dense hash produces n microcredits, while Merkle trees only get $$\left\lfloor \frac{n+1}{2} \right\rfloor.$$

This doubling carries over into the traversal algorithm computation, so that pre-order traversed dense hash requires half the computation per microcredit. Unless otherwise mentioned, the remainder of the detailed description will focus on dense hash trees with breadth-first enumeration.

Various Embodiments of An Exemplary Accounting Mechanism

Embodiments of the present invention are designed to provide secure accounting methods, components and systems that allow a foreign service provider (FSP) to provide services to customers that have a relationship with a home service provider (HSP). As a consequence of their relationship with the (HSP), the customers are allowed to purchase the FSP's services, preferably on credit. Later, the HSP preferably reimburses the FSP appropriately for services rendered to the customers. The customers preferably are billed by the HSP. The FSP and the HSP can be the same entity. Thus, the accounting mechanism of embodiments of the present invention is not limited to provision of services by third parties.

Embodiments of the accounting technique described herein have two crucial properties: security and efficiency. The first property, cryptographic security, prevents a dishonest FSP, HSP or customer from manipulating the accuracy of the accounting. More specifically, it is cryptographically infeasible for the FSP to overstate use of its services by customers, for the HSP to understate (to the FSP) the customers' use of the FSP's network or overstate (to the customer) the customer's use of the FSP's network, or for the customer to disavow (either to the FSP or HSP) any of its usage of the FSP's network. As will be explained in more detail below, a user's microcredit tokens are non-repudiable in that they verifiably and indisputably were spent by the user. Non-repudiability makes billing disputes less likely; this is important, because billing disputes are expensive to resolve and these expenses are typically passed down to customers. In short, the accuracy of the accounting is enforced and proven cryptographically.

The second property, efficiency, is also crucial. Embodiments of the present invention are designed to enable the easy development of transitive business relationships, not become a barrier to them. In one embodiment, the accounting mechanism is as transparent as possible to the party's that use it. As will be explained in more detail below, embodiments described herein are more computationally efficient than approaches from the prior art.

Assuming that the HSP and the FSP have agreed to allow HSP's customers to use FSP's services (subject to remuneration), a customer that wishes to use FSP's services demonstrates to the FSP that it has a relationship with (e.g., perhaps because it is a client of) the HSP. In one embodiment of the present invention, this is accomplished through the use of a digital certificate. For example, if the HSP has a public signing key that is known to the FSP, the HSP can use its private signing key to produce a certificate that attests that the user is a client of the HSP. This certificate may, for example, have the form $\text{Sig}_{SK_{HSP}}(U, PK_U, \text{time})$, where the HSP uses its private signing key $SK_{HSP}$ to sign a "digital document" containing the user's name, the user's public signing key $PK_U$ and a value indicating the validity period of the certificate. Alternatively, the HSP may use some other method of allowing the user to demonstrate to the FSP that the user is a client of the HSP. Also, a trusted party other than the HSP may produce a certificate, or use some other mechanism, that allows the user to demonstrate that it is HSP's client. Thus, from a security perspective, the FSP is concerned that the user is a customer of HSP and that the public key of the user is indeed his.

Micro-credit Token Generation

In one embodiment, the user generates its own micro-credit tokens. Of course, other entities could generate the user's tokens. For example, the HSP could generate the user's tokens, but (as will be explained in more detail below), having the HSP generate all user tokens makes the scheme less scalable for the HSP; having the user's generate their own tokens substantially reduces the HSP's workload. Alternatively, other entities could generate the user's tokens. However, such an entity would have to be trusted not to reveal the tokens to the FSPs without user's consent. Also, allowing any entity other than the user generate the user's tokens removes the advantage of non-repudiability (i.e., if someone else generates user's tokens, the user can always claim that the tokens were spent by someone else).

Preferably, the user generates its microcredit tokens using a hash tree, such as, for example, a Merkle tree or a dense hash tree. This is preferable for efficiency reasons; hash functions, such as SHA-1, are known in the art that appear to have cryptographically strong properties while being computationally lightweight. Certainly, microcredit tokens could be generated in other ways. For example, the user can receive microcredit tokens directly from the HSP. In such a case, "micropayment" scheme essentially exists in which the HSP acts like a bank and the FSP acts like a merchant. In that case, one embodiment, wherein the HSP generates tokens using a dense hash tree provides a preferable micropayments scheme which has the nice property that verification and aggregation are very efficient. Furthermore, if the tree is split, several users can leverage the same signature made by the HSP. Therefore, in summary, one embodiment of the present invention can also be used in the context of micropayments, and the embodiment of the invention has advantages over prior art.

In yet another example, the user could generate its own microcredit tokens using a public-key signature scheme, producing non-repudiable signatures which it gives to the FSP. However, public-key signature algorithms are much less computationally efficient than hash functions; thus, in one embodiment, to reduce the use of public-key cryptography and not use public-key signing for each individual token. On the other hand, to achieve non-repudiation, in one embodiment, a public-key signature algorithm is used (once) to sign the root of the hash tree. This non-repudiable signature anchors the entire hash tree to user's identity, so that all of the tokens related to the tree are tied to user's identity. Therefore, the cost of a single signature is amortized over many transactions.

In one embodiment, there is a one-time set-up phase. During the one-time set-up phase, the following steps are performed:

1. HSP creates a public/private key pair ($Pk_{HSP}$, $Sk_{HSP}$). It provides the public key (out of band) to each user and each FSP with which it does business.
2. Each user generates a public/private key pair ($Pk_U$, $Sk_U$). It presents $Pk_U$ to the HSP and proves that it knows the corresponding private signing key; this step can be accomplished by signing a series of challenge messages or by providing a zero-knowledge proof.
3. If the user successfully convinces the HSP that it knows the signing key, and if the user is an authorized subscriber of the HSP, then the HSP first constructs certificate data $\text{CertData}_U = <U, Pk_U, d_{exp}, d_{issue}, \Pi_U>$ where $d_{exp}$ and $d_{issue}$ are the date of expiration and the date of issuance of the certificate respectively, and $\Pi_U$ is a policy specifying information regarding what services are authorized, and such information. The date of expiration can either be a numerical date or could specify that the certificate is valid for some number of time periods from the date of issuance (e.g., 365 days).
4. The HSP computes $\sigma_U = \text{Sign}(Sk_{HSP}, \text{CertData}_U)$ and provides ($\sigma_U$, $\text{CertData}_U$) to the user. Note that HSP effectively is the certificate authority in a closed public-key infrastructure.
5. The user checks that $\text{Vf}(Pk_{HSP}, \text{CertData}_U, \sigma_U) = 1$. If so, the user accepts; if not, he informs the HSP.

In one embodiment, the hash tree is a dense hash tree. In one embodiment, constructing a dense hash tree comprises performing the following steps:

1. The user first estimates the number m of coins it will require initially. This estimate need not be accurate if the user underestimates, it can still generate more coins on the fly. However, from a performance perspective, the user should aim to be as close as possible in its estimate.
2. The user randomly generates m+1 bitstrings, preferably of cryptographically suitable length n-bits (e.g., n=160 bits apiece).
3. The user constructs a (nearly) balanced binary tree with m+1 leaves (and 2m+1 nodes in all). It assigns the random bitstrings to the leaves.
4. The user computes the values to be assigned to each internal node (including the root node) according to the values of the internal node's children. For example, one may compute the value of an internal node according to the formula $\text{Value}(v) = H(IV, \text{Value}(C_0(v)) \circ \text{Value}(C_1(v)))$, where $C_0$ and $C_1$ are the children of the internal node.

Figure 4:
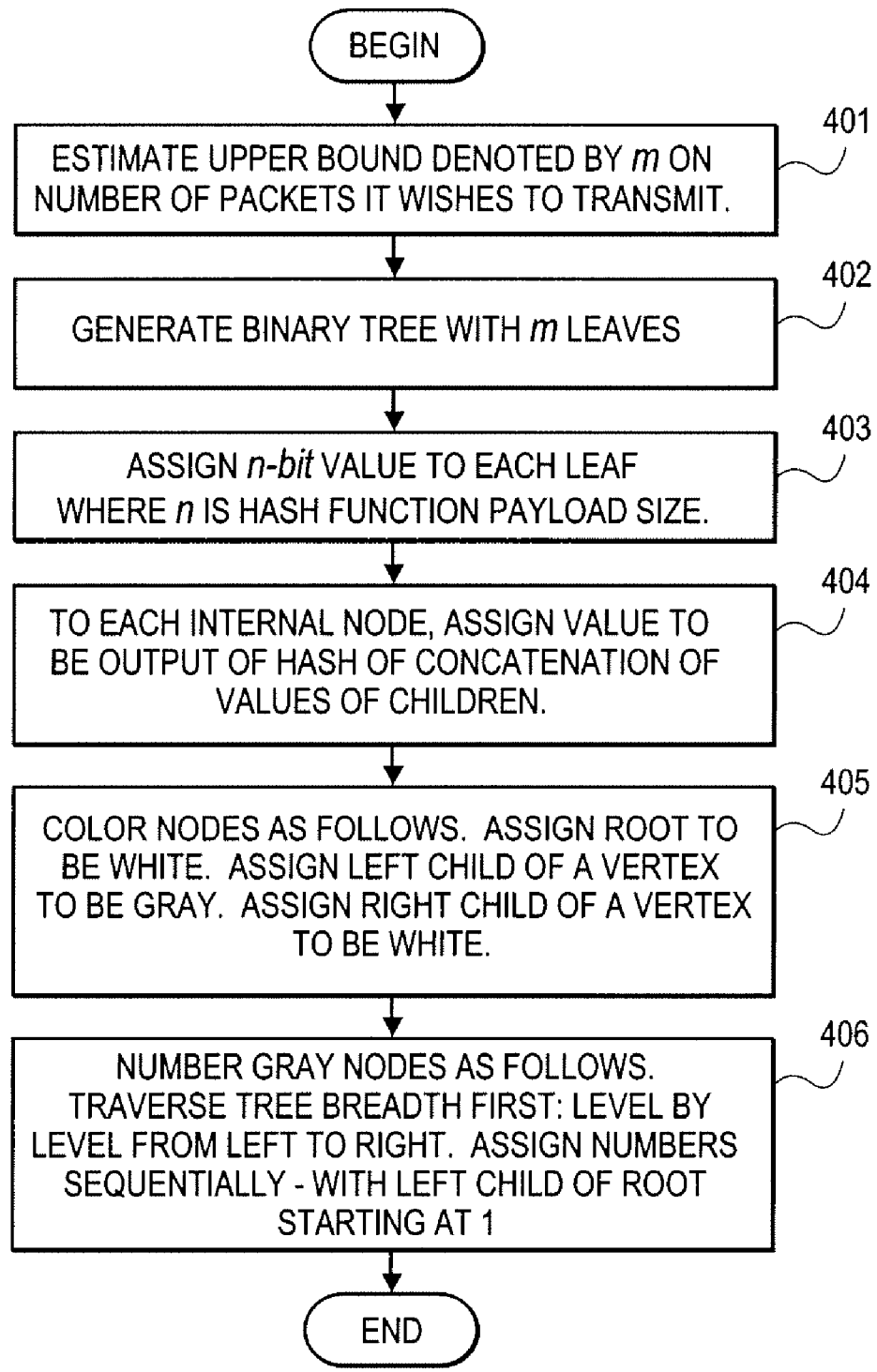
FIG. 4 is one embodiment of a process for constructing a dense hash tree.

FIG. 4 is a flow diagram of one embodiment of a process for constructing a dense hash tree. The process is performed by processing logic, which may comprise hardware (circuitry, dedicated logic, etc.), software (such as is run on a general computer system or a dedicated machine), or a combination of both.

Referring to FIG. 4, the process begins by processing logic estimating the upper bound on the number of packets it wishes to transmit (processing block 401). This upper bound is denoted by m. Next processing logic generates a binary tree with m leaves (processing block 402). After generating the binary tree, processing logic assigns a random n-bit value to each leaf, where n is the hash function pay load size (processing block 403). Once the n-bit value is assigned to each internal node, processing logic assigns a value to the output of the hash of the concatenation of the values of the children (processing block 404).

Then, processing logic colors the nodes (processing block 405). In one embodiment, processing logic colors the nodes by assigning a root to be white, assigning the left child of a vertex to be grey, and assigning the right child of a vertex to be white. After coloring nodes, processing logic numbers the grey nodes (processing block 406). In one embodiment, processing logic numbers the grey nodes by traversing the tree breadth width first, level by level from left to right. Processing logic also assigns numbers sequentially, with the left child of the root starting at one. Note that using colors in the algorithm is for explanation purpose and any mechanism for partitioning the nodes into two sets may be used.

Many variations on this procedure are possible. For example, the tree does not necessarily need to be binary, though this is preferable because nodes in a binary tree will tend to have fewer co-nodes, since each node has fewer siblings. Also, the internal nodes could be computed according to different formula (e.g., each hash input could include a node indexing number, the identity of the FSP for which the microcredits are intended, or other information).

Overview of Accounting Process Flow

As mentioned previously, the user preferably computes a digital signature on the root of the tree using its private signing key. Let Value(root) be the computed value for the root of the tree. The user's signature may be computed as Sign $SK_U$ (Value(root)). Again, the user may include additional information in the document to be signed (besides the root value). For example, the user may include the identity of the FSP for which the microcredits are intended, the maximum number n of microcredits that the FSP may receive from the tree, any conditions that FSP must satisfy before it can redeem the microcredits from the HSP or other information.

When the user wishes to begin a session of accessing services from the FSP, it sends to the FSP (preferably at the start of the session) the root value, its signature on the root value, its public key, and the certificate from the trusted party attesting to the relationship between the user and the HSP. The user need not send these values if the FSP already has them. For example, if user has had a session with the FSP in the past, the FSP may already have the certificate. The FSP may even have the root value and signature on the root value if the user wishes to initiate a new session that uses an old tree that may have already been partially consumed.

Upon receiving the user's signature, its public key, and the signed root value (together with any other information that was signed), the FSP may verify that the signature is legitimate using the verification algorithm of the signature scheme. For a signature scheme, as is well-known in the art, the verification algorithm is typically an algorithm that takes the signature, public key, and the message as input, and outputs a boolean value indicating whether the signature is valid or not: Vf($\sigma$, PK, M)=0 or 1. The FSP may use a similar procedure to verify the certificate produced by the trusted party.

In one embodiment, the "payment" that the FSP receives from the user consists of (possibly in addition to the signature and certification information described above) hash pre-images. Hash pre-images are hash function inputs involved in the generation of the hash tree. Since hash functions, as used in embodiment of the present invention, are one-way (i.e., it is easy to compute the output from the input, but infeasible to compute the input from the output), the FSP cannot feasibly compute these hash pre-images by itself. Of course, if microcredits are not generated using a hash tree, then the payment will take a different form. For example, if the user generates each microcredit using a signature scheme, then each token consists of a digital signature. Note that this is very expensive computationally.

At the beginning of the session, the user and the FSP preferably negotiate how payment should be made. For example, payment could be made before the FSP provides any service, or only after the FSP has provided full service. Although it is certainly compatible with either of these approaches, embodiments of the present invention allows a more flexible approach. For example, if the FSP's service can be broken up into small, discrete chunks, the FSP may provide service "incrementally", providing a given chunk only after the user has furnished an additional microcredit. For example, if the FSP is providing the user with a video stream, then the FSP may transmit the $k^{th}$ frame of the stream only after receiving the $k^{th}$ microcredit from the user. For simplicity and generality, the ensuing description focuses on the case where the user furnishes microcredits to the FSP in sequence.

In an embodiment of the present invention where the user uses a dense hash tree, the $k^{th}$ microcredit will include the value of gv(k), which is the $k^{th}$ grey vertex in the dense hash tree counting breadth-first (which is also the $k^{th}$ left child in the tree), together with the values of CoNodes(gvk)). Of course, the nodes in the dense hash tree could be enumerated differently (e.g., the $k^{th}$ node in the tree could be the $k^{th}$ right child in the tree counting from the right side of the tree, or some other enumeration scheme could be used), but this description focuses on the above enumeration for simplicity. From the detailed description included herein, it will be clear to one of ordinary skill in the art how the present invention can use an ordinary Merkle tree rather than a dense hash tree, though the resulting scheme would not be as efficient.

The user may compute the $k^{th}$ microcredit in a manner analogous to how it generated the hash tree. The n+1 leaf values that the user used in computing the hash tree give the user all the information it needs to recompute the values of all nodes in the tree, and hence the node values corresponding to the $k^{th}$ microcredit. For convenience, the user may have computed the n+1 leaf values using a small secret "seed" value; using this seed value, the user can recompute any leaf values that are necessary to compute the $k^{th}$ microcredit. The seed should be long enough to resist a brute force attack (e.g., 80+bits in length). Using a small seed value saves the user from having to store n+1 separate values. Alternatively, the user may store the values of all nodes in the tree, so that the user need not perform any recomputation. Yet another alternative is that the user may choose a desired tradeoff between the amount of storage it uses and the amount of recomputation it needs for the recomputation of the values needed for a microcredit. In the case of a Merkle tree, there is a well-known computation-storage tradeoff, where computing the next Merkle path requires logm computation and $\log_2 m$ memory, where m is the number of leaves in the tree. If the nodes in the dense hash tree are numbered differently, and modify the structure of the tree slightly so that a node is inserted between each child and its parent, then an extension of this method can be used to "traverse" the dense hash tree. In this extension, the "grey nodes" are enumerated from left to right, where the left child of a parent comes before its parent and the right child comes after. As before, the $k^{th}$ microcredit consists of the value of the $k^{th}$ grey node, together with the values of its co-nodes. The co-nodes, in this case, will each be one of the nodes that was "inserted" into the dense hash tree. Many other methods of efficiently traversing the dense hash tree (or a slight variant of it) may be used.

To receive the $k^{th}$ chunk of service, the user may send the $k^{th}$ microcredit to the FSP. If some of the co-nodes of gv(k) correspond to values of gv(j) for j<k or to values of co-nodes of gv(j) for j<k, as will always be the case if k>1 and the usual enumeration of the dense hash tree is used, then the values of these co-nodes need not be retransmitted to the FSP if the FSP has cached these values.

The FSP may verify the $k^{th}$ microcredit by confirming that the claimed value of gv(k) and the claimed values of CoNodes (gv(k)) "hash to" the root value of the hash tree that the user has signed. More specifically, using the same formula that was used for computing the values of the internal nodes in the actual hash tree (e.g., Value(v)=H(IV, Value($C_0$(v)) o Value ($C_1$(v)))), the FSP may recursively compute a tentative value for the root node using the tentative values of gv(k) and CoNodes(gv(k)): first by computing Value(Parent(gv(k))) as H(IV, Value(gv(k)) o Value(Sibling(gv(k))), and so on. The FSP accepts the claimed $k^{th}$ microcredit as valid if the tentative root value is the same as the actual root value included in user's (verified) signature. Otherwise, the FSP may reject the claimed $k^{th}$ microcredit. Depending on whether the microcredit was valid or not, the FSP may continue or discontinue service to user.

As mentioned previously, the FSP may cache values of nodes and co-nodes that have previously been revealed by user. This may allow the FSP to reduce the time it needs to verify the $k^{th}$ microcredit. For example, if the FSP caches all such values, then (if a dense hash tree is used), the value corresponding to Parent(gv(k)) will be in the cache. In this case, the FSP need only confirm that the values for gv(k) and its sibling "hash to" the value for their parent (e.g., H(IV, Value(gv(k)) o Value(Sibling(gv(k))) equals Value(Parent(gv (k)))).

When the session between the FSP and user ends, or when the FSP and the user no longer use a given hash tree as a source of microcredits, the FSP may wish to reduce the amount of memory that it needs to store the final microcredit sent by the user. Suppose the final microcredit consists of the value of gv(k) together with the values of its co-nodes. The FSP has the option of storing only the value of gv(k) (preferably together with the index k), and removing the values of the co-nodes from memory. The advantage of this, of course, is a reduction in the amount of memory needed by the FSP. The disadvantage is that the abbreviated token is no longer verifiable; the values of the co-nodes are needed to verify.

In the description herein, the abbreviated token is called an undeniable token or undeniable microcredit. The reason is that, although the undeniable token can no longer be verified, the user cannot deny that the token is valid if it is. To prove that an undeniable $k^{th}$ microcredit is invalid, the user must be able to produce a claimed value of gv(k) different from that contained in the undeniable microcredit, together with claimed co-node values of gv(k), that "hash to" the root value signed by the user. If the user is unable to accomplish this (and, by the collision-resistance properties of the hash function, it should be infeasible if the token is valid), then the undeniable token may be presumed valid. To protect itself, the user preferably "remembers" the seed value(s) that it used in generating the hash tree; the user may store a seed value that generates secondary seed values that in turn are used to generate individual hash trees. In summary, a valid undeniable token is non-repudiable proof that the user spent the token, even though the token may not be verifiable without the user's assistance; it is therefore acceptable (if consistent with the agreements among the HSP, the FSP, and the customer) for the FSP to store only an (abbreviated) undeniable token.

If the user produces its signature using a signature scheme that allows "multisignatures" or "aggregate signatures", then it is possible that the FSP may reduce the amount of storage needed to store multiple of signatures, and hence the amount of storage needed to store multiple tokens. For example, if the user uses the RSA signature scheme, many of its RSA signatures on a multiple documents can simply be multiplied together (modulo its RSA modulus) to create a compact multisignature verifiably indicating the user's approval of each of the documents. Thus, aggregating signatures are more useful in this setting than multi-signatures. Also, the user may use a signature scheme that allows multiple signatures by multiple parties on multiple documents to be aggregated. If the customers use such a signature scheme, the FSP can aggregate the signatures of the customers to save memory (and bandwidth when the signatures are transmitted to the HSP). In an alternate embodiment of the present invention, the HSP can set up a cryptographically secure "group signature" scheme whereby the user can produce its signature using such a scheme. In that case, the FSP will not be able to identify the user but will be assured by the cryptographic properties of the group signature scheme that the user is indeed a user of the HSP. However, the FSP will be able to link transactions made with the same signature (only within a given session). The reason for linkability is that the microcredit tokens are linked to one signature. In general, for a group signature, no one except the group manager can link two signature to each other. The HSP can associate a signature with the user who signed since it will act as the "group manage" for the group signature scheme.

The FSP and the user, after the termination of a session, may continue using a hash tree that they used in a previous session, beginning with the microcredit following the last microcredit used in the previous session.

When the FSP wishes to redeem microcredits received from the user, the FSP preferably transmits to the HSP the final microcredit received from the user. This microcredit may be verifiable (with all necessary co-node values included) or undeniable. The FSP preferably also transmits the user's signature, as well as the information that was signed (which preferably includes the root value of the hash tree that was used). The FSP may elect to delay transmission of the final microcredit so that it can send several final microcredits in a single transmission.

If the token is undeniable but not verifiable, the HSP may demand additional assurance from the FSP that the token is valid. For example, the HSP may demand a signature from the FSP, using the FSP's signing key, attesting that the FSP promises to reimburse the HSP for any dispute resolution costs relating to the authenticity of the undeniable token. The FSP and the HSP may agree to some other arrangement.

Upon receiving a verifiable token from the FSP, the HSP can verify it in essentially the same way that the FSP could verify it. If the $k^{th}$ token is sent, the HSP can verify it by performing a single signature verification and performing at most $\lceil \log_2(k+1) \rceil$ hash computations. Notice that the HSP's verification cost is not proportional to k, as in previous micropayment schemes, but is instead proportional to the logarithm of k. This is a huge reduction in HSP's workload, and dramatically increases the scalability of the payment approach. If the HSP determines that the token is valid, it preferably stores the token and provides appropriate compensation to the FSP for providing services to user.

If the HSP receives an undeniable token, it cannot verify it. It can, however, check the validity of user's signature on the root value (and any other information). If the signature is valid, the HSP preferably stores the token (in case a future dispute arises), and provides appropriate compensation to the FSP in accordance with their agreement. After checking the validity of the token to the extent possible, the HSP may bill the user's account accordingly.

Exemplary Flow Diagrams

Figure 1:
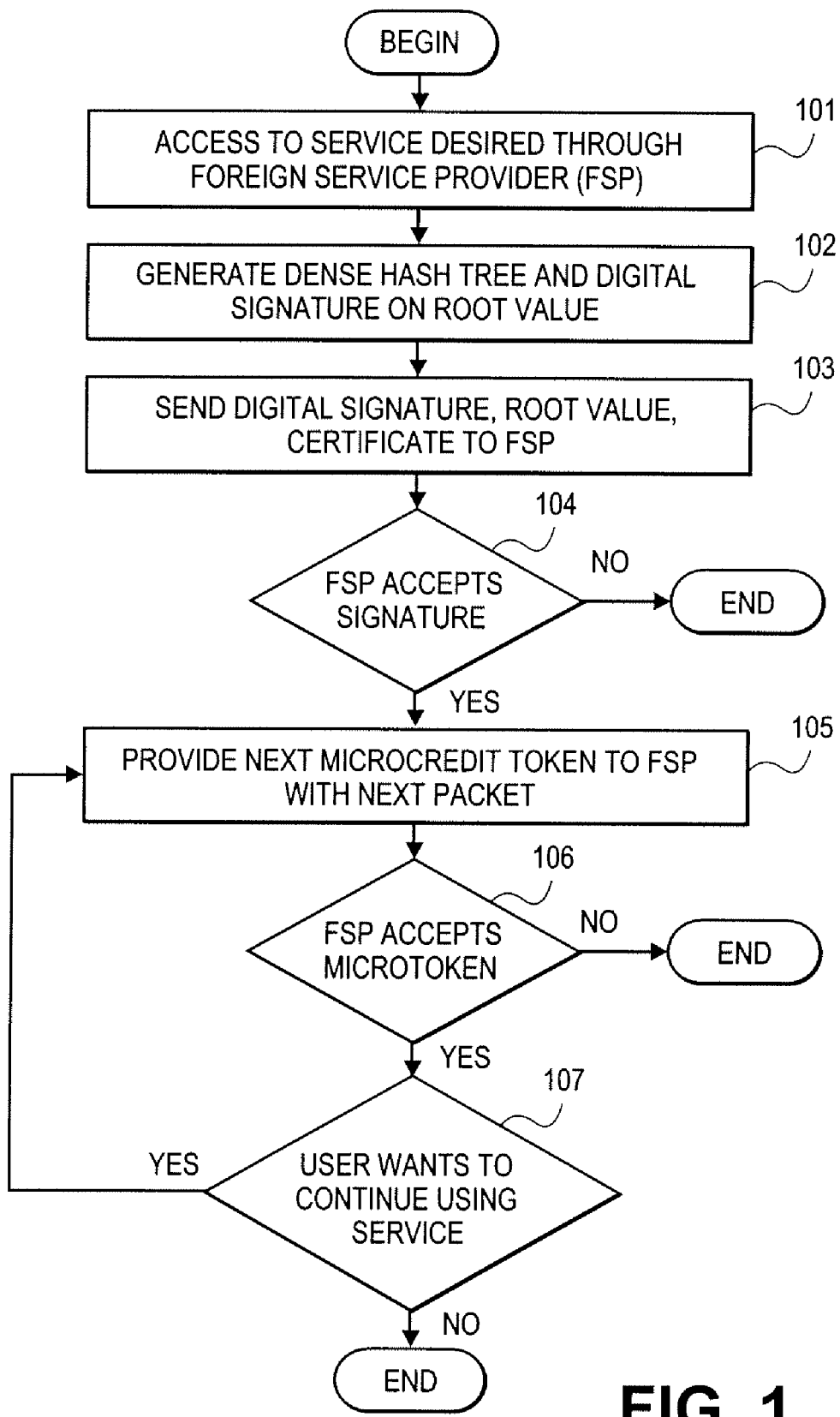
FIG. 1 is a flow diagram of one embodiment of the process for a user to securely use a foreign service provide to access a service

FIG. 1 is a flow diagram of one embodiment of a process for a user to securely use a foreign service provide to access a server. The process is performed by processing logic, which may comprise hardware (circuitry, dedicated logic, etc.), software (such as is run on a general computer system or a dedicated machine), or a combination of both.

Referring to FIG. 1, the process begins by processing logic accessing a service desired using a foreign service provider (FSP) (processing block 101). Next, processing logic generates a dense hash tree and a digital signature on a root value of the hash tree (processing block 102). Then, processing logic sends the digital signature, the root value and a certificate to the FSP (processing block 103).

Processing logic tests whether the FSP accepts the signature (processing block 104). If it does not, processing logic ends the process. If it does, processing logic provides the next microcredit token to the FSP with the next packet (processing block 105). Then the processing logic tests whether the FSP accepts the microtoken (processing block 106). If it does not, processing logic ends the process. If it does, processing logic tests whether the user wants to continue using this service (processing block 107). It does not, processing logic ends the process. If it does, the processing transitions to processing block 105 and continues the process.

If the user runs out of tokens, the user creates another dense hash tree, signs the root, and provides the relevant information to the FSP. This results in an extra signature computation and verification, so is not desirable. However, since hashing is much less expensive than signing, the user can take precautions by generating a larger number of coins, with minimal penalty. One distinct advantage of using dense hash trees is that verification time is proportional to the logarithm of the grey vertex number. If one were to try using regular trees, then the verification time would be proportional to the entire height of the tree. The latter might be significantly larger if the user generates many more coins than he eventually uses.

Figure 2:
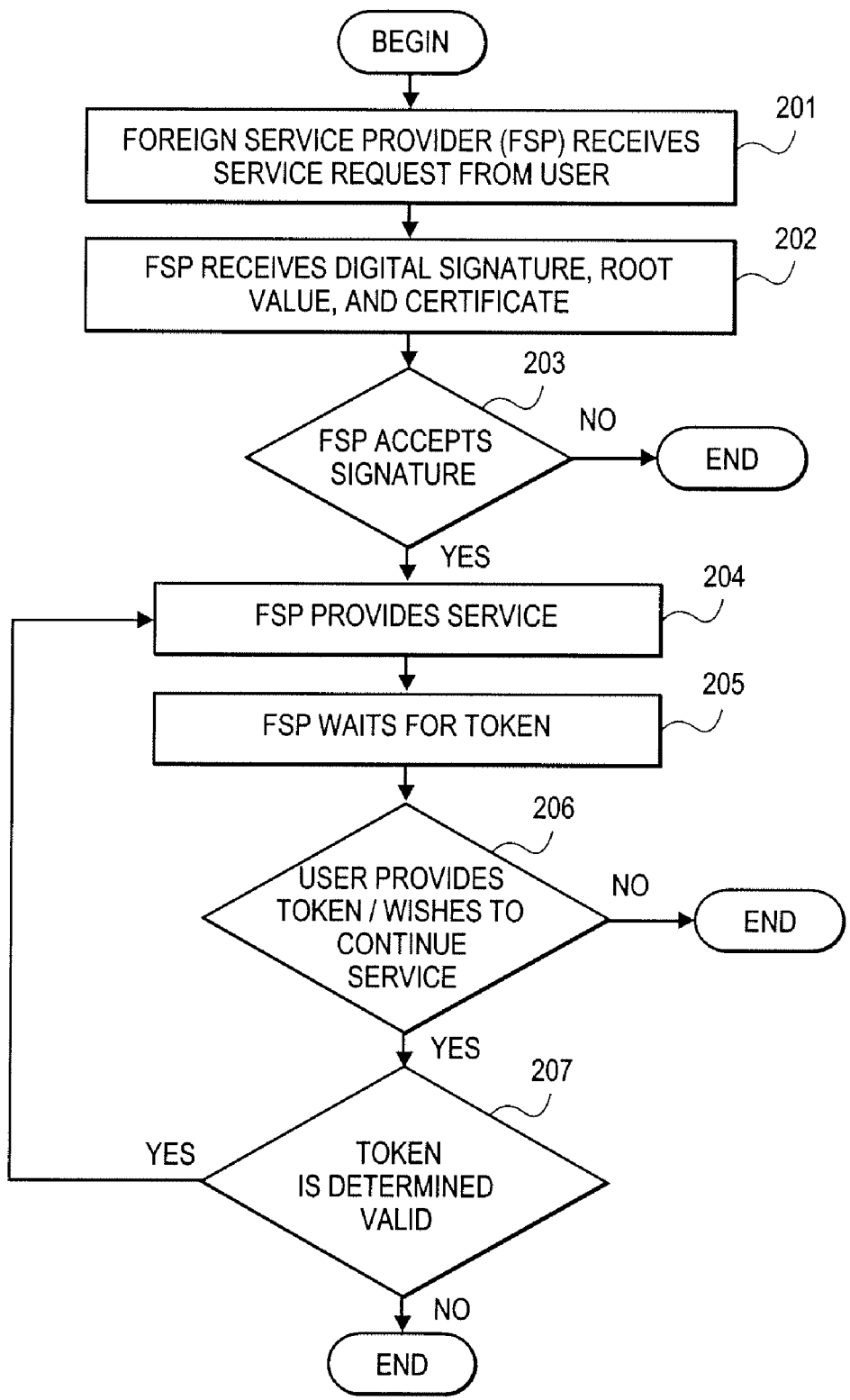
FIG. 2 is a flow diagram of one embodiment of a process used by a foreign service provider to securely provide a user with a service.

FIG. 2 is a flow diagram of one embodiment of a process used by a foreign service provider to securely provide the user with a service. The process of FIG. 2 is performed by processing logic, which may comprise hardware (circuitry, dedicated logic, etc.), software (such as is run on a general computer system or a dedicated machine), or a combination of both.

Referring to FIG. 2, the process begins by processing logic of the FSP receiving a service request from a user (processing block 201). Then processing logic of the FSP receives a digital signature, a root value and a certificate (processing block 202). Thereafter, processing logic and the FSP tests whether to accept the signature (processing block 203). If it does not, processing logic ends the process. If it does, processing transitions to processing block 204 where processing logic in the FSP provides the requested service. Thereafter, processing logic in the FSP waits for a token (processing block 205).

Processing logic tests whether the user provides the token and/or wishes to continue using the service (processing block 206). If not, processing logic causes the process to end. If it does, processing logic tests whether the token is valid (processing block 207). If the token is not valid, processing logic causes the process to end. If the token is valid, processing logic transitions to processing block 204 and the process continues.

Figure 3:
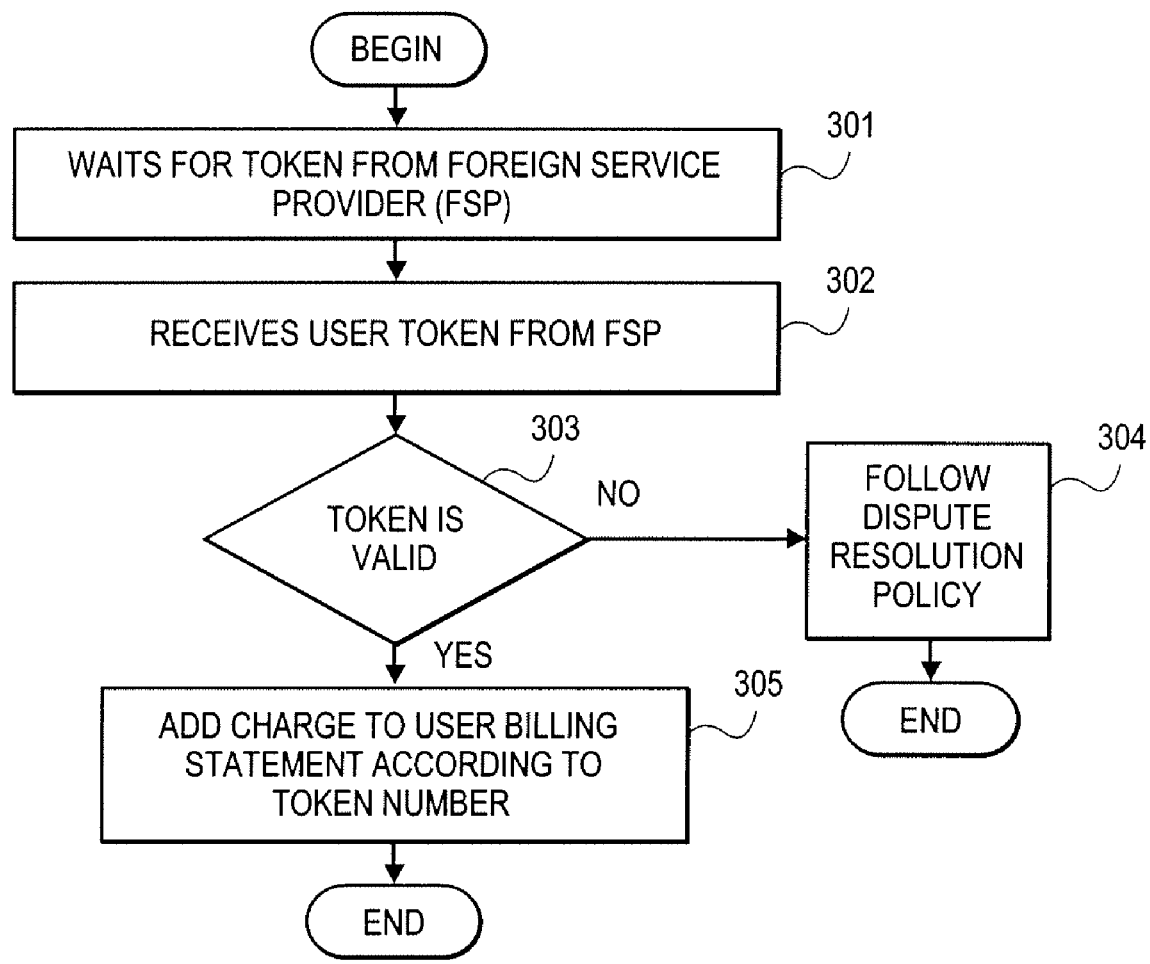
FIG. 3 is a flow diagram of one embodiment of a process used by a home service provider to accurately and securely account for the service access by the user through a foreign service provider.

FIG. 3 is a flow diagram of one embodiment of a process used by a home service provider to accurately and securely account for the service access by the user through a foreign service provider. The process is performed by processing logic, which may comprise hardware (circuitry, dedicated logic, etc.), software (such as is run on a general computer system or a dedicated machine), or a combination of both.

Referring to FIG. 3, the process begins by processing logic waiting for a token from an FSP (processing block 301). When processing logic receives the user token from an FSP (processing block 302), processing logic tests whether the token is valid (processing block 303). If the token is not valid, processing logic follows a dispute resolution policy (processing block 304) and the process ends. If the token is valid, processing logic adds a charge to the user billing statement according to the token number (processing block 305) and the process ends.

Exemplary Components and Systems

Figure 5:
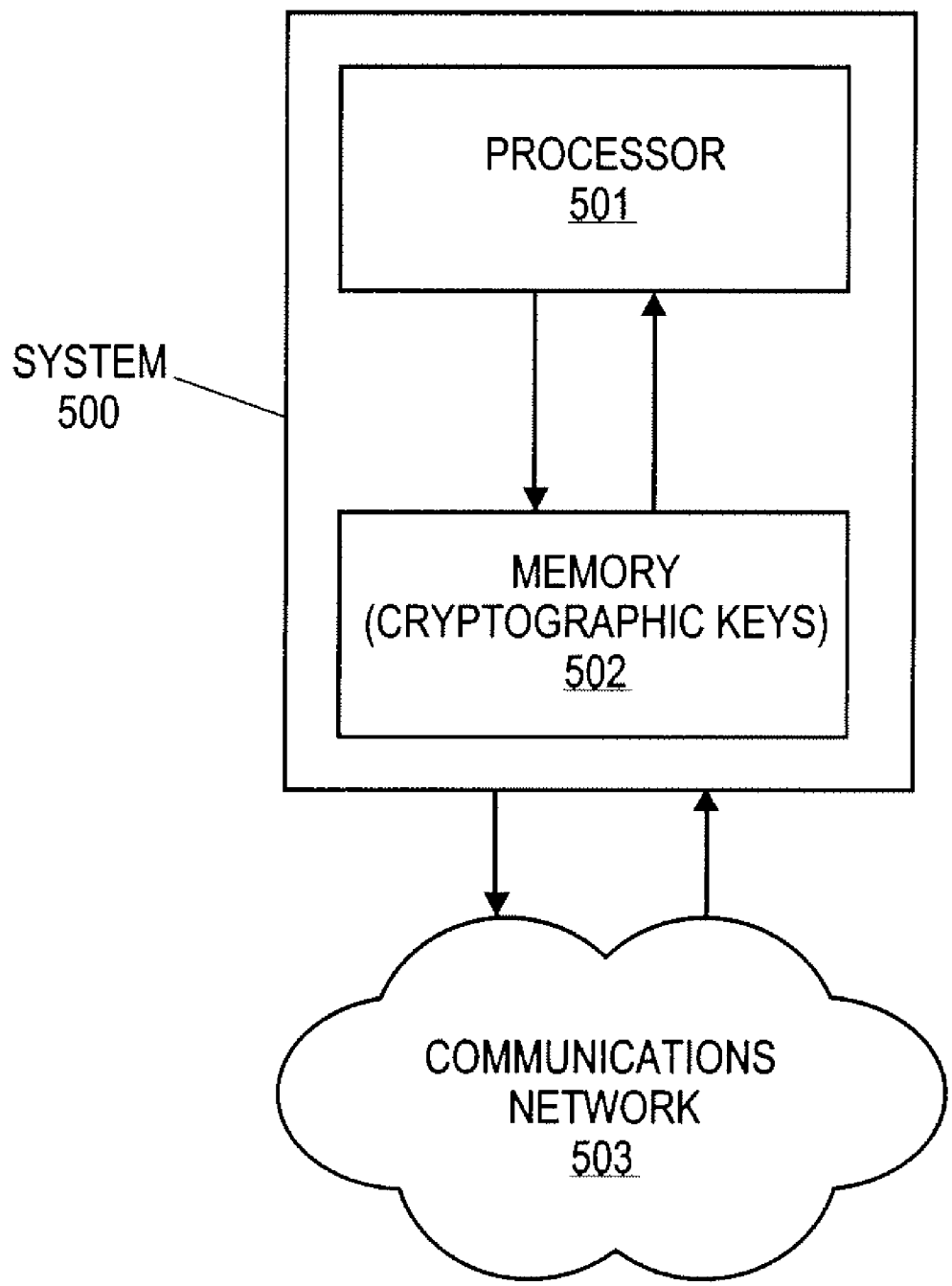
FIG. 5 is a block diagram of one embodiment of a user, a HSP or a FSP component.

An individual component is illustrated in FIG. 5. This component may be a user component, a HSP component, and/or a FSP component, in accordance with one embodiment of the present invention.

FIG. 5 is a block diagram of one embodiment of a user, HSP or FSP component. Referring to FIG. 5, a processor 501 is coupled to memory 502. Processor 501 performs one or more of the operations described herein. Memory 502 operates in conjunction with processor 501 to provide data and/or instructions to processor 501. Memory 502 may store the cryptographic keys. System 500 is coupled to communications network 503 to exchange information there between. A more detailed description of system 500 is given below.

Figure 6:
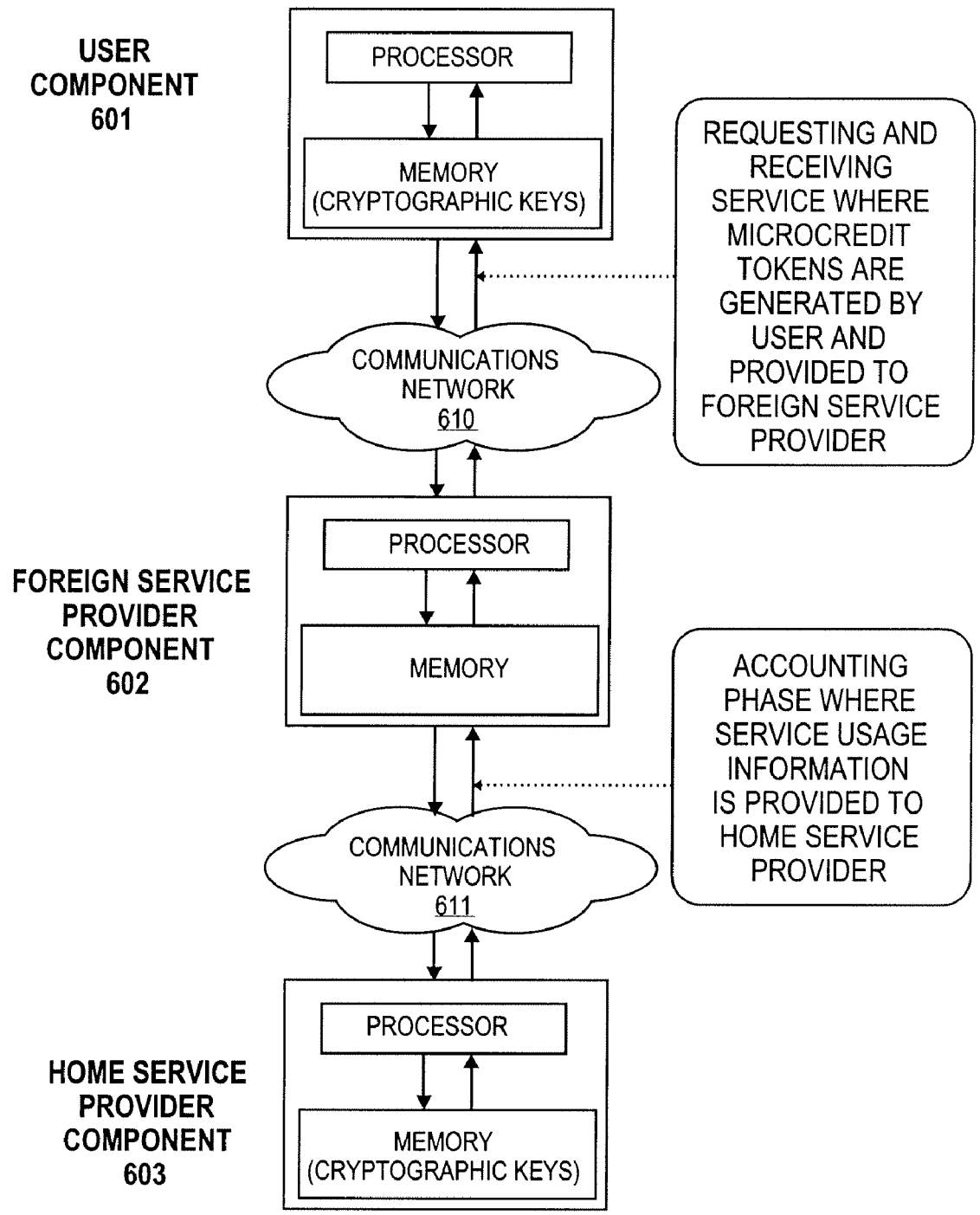
FIG. 6 is a block diagram of a system configuration having a user, a FSP and a HSP.

A system configuration with a user, a foreign service provider and a home service provider in accordance with one embodiment of the present invention is illustrated in FIG. 6.

FIG. 6 is the system configuration with the user, the FSP and the HSP. Referring to FIG. 6, user component 601 is communicatably coupled with FSP component 602 via a communications network 610. Similarly, FSP component 602 is communicatably coupled with HSP component 603 via communications network 611. Note that communications network 610 and 611 may be the same or different communications networks. User component 601 uses communications network 610 to request and receive a service from FSP component 602 where microcredit tokens are generated by the user and provided to FSP component 602. Likewise, FSP component 602 uses communications network 611 to perform an accounting phase where service usage information is provided to HSP component 603 to perform accounting.

Alterative Embodiments

In an alternative embodiment, the process may occur according to the following:

1. The user estimates how much service he wishes to use in terms of the number of transactions that will take place. We denote this number by m. This estimate does not have to be accurate and the user can always generate additional microcredit tokens as we will see. Performance improves with accuracy, though the user is better off overestimating rather than underestimating.

2. The user creates a dense hash tree with $(m+1)=2^k$ leaves (which correspond to m grey vertices). Let r denote the root of the tree. The user computes $\sigma_r=\text{Sign}(Sk_U, FSP, \text{Value}(r))$. It sends $<h\text{Value}(r), \sigma_r, \text{CertData}_U, \sigma_U>$ to the FSP and makes an official service request.

3. The FSP examines $\Pi_U$ to ascertain that the user indeed can use the service in question. Next, FSP verifies that $d_{issue}<d_{exp}$ on the certificate data $\text{CertData}_U$. Finally, it checks if $\text{Vf}(Pk_{HSP}, \text{CertData}_U, \sigma_U)=1$ and $\text{Vf}(Pk_U, \text{Value}(r), \sigma_r)=1$. If these check out correctly, it grants the service request. Otherwise, it follows an appropriate policy, such as, for example, refusing service. Also, if the certificate scheme incorporates some direct revocation mechanism, then the certificate should be checked for validity. The process by which that is done is essentially orthogonal to the present scheme.

4. At each period i, if the user wishes to continue service, it provides the FSP with the $i^{th}$ microcredit token $\text{Value}(gv(i))$ as well as $\text{Value}(\text{Sib}(gv(i)))$ (if the latter exists).

5. The FSP computes $hv=H(\text{Value}(gv(i)) \circ \text{Value}(\text{Sib}(gv(i))))$, if $i \leq (m-1)/2$, or simply $hv=H(\text{Value}(gv(i)))$ otherwise. If i is even, the FSP checks if $hv=\text{Value}(gv(i/2))$. Otherwise, it checks if $hv=\text{Value}(\text{Sib}(gv((i-1)=2)))$. Observe that the FSP can perform these computations since it received $\text{Value}(gv(i/2))$ and $\text{Value}(\text{Sib}(gv((i-1)/2)))$ at iteration $\lfloor i/2 \rfloor$. If these checks succeed, FSP accepts the user's token. Otherwise, it rejects the token and applies an appropriate policy, like terminating service, perhaps with some advance warning.

Billing

If the customers use appropriate signature schemes, the HSP can batch signatures to save memory, just as the FSP can. Also, again like the FSP, the HSP can batch verify the signatures.

The methods and systems of embodiments of the present invention are compatible with a "lottery" style approach to billing that allows the parties, particularly the FSP and the HSP, to further reduce their memory and transmission requirements. In this approach, it is possible that a microcredit paid by the user may not be redeemable, or that it may be redeemable at many times its expected value.

The FSP and the HSP only need to store the "winning" microcredit tokens. The disadvantage of using a lottery system is threefold:

1. billing among the parties is not entirely accurate since an FSP may be lucky or unlucky (with user being unlucky or lucky);
2. the inherent inaccuracy of the approach encourages expensive billing disputes; and
3. the lottery system only allows a constant-factor reduction in memory requirements, rather than the potentially exponential reduction allowed by the microcredit scheme of the present invention (since the FSP and the HSP only need storage proportional to the logarithm of the number of tokens).

Such a lottery style approach has been described in the art in connection with micropayment schemes, and applying this approach to the microcredit scheme of the present invention, if desired, is straightforward.

It is worth noting that a tradeoff exists in the size (bandwidth) of the microcredit versus the time needed by the HSP to verify it. In one embodiment, using breadth-first dense hash trees, the $k^{th}$ microcredit consists of $O(\log(k))$ node values and may be verified in $O(\log(k))$ time; a hash chain has constant size, but requires $O(k)$ verification time. One can find tradeoffs in between by replacing each node in a binary tree with a hash chain. If each chain has length l, one gets a hybrid dense hash/hash-chain microcredit scheme, where the size of the $k^{th}$ microcredit is at most $1+\log(k/l)$ and the verification time is at most $l*(\log(k/l))$.

Polling

One may incorporate polling into the schemes described herein to lower computational effort, at an increased risk in fraud, in at least two places. First, when the FSP receives microcredits from the user, it can choose whether or not to immediately verify each token according to some probability (this does not apply to the first and last tokens, which should always be verified). If the user tries to cheat, then at the very least, he will either be caught when the last token is verified, or there will at least be some prior valid token that can be used to bill the user. If an FSP keeps track of such user behavior, it can tailor the polling probability dynamically.

One may also incorporate polling into the bill reconciliation phase. For illustration, suppose s users have finished accessing the service through the FSP. Suppose further that the roots on the dense hash trees they generate are $r_1, \ldots, r_s$; respectively and that the amount of service they use is $t_1, \ldots, t_s$; respectively. At bill reconciliation time, the FSP sends $<\text{Value}(r_1), t_1>, \ldots, <\text{Value}(r_s), t_s>$ to the HSP. Next, the HSP picks a set of k indices $i_1, \ldots, i_k \in \{1 \ldots, s\}$ and sends these to the FSP. Finally, the FSP transmits $$<t_{i_j}, \text{Value}(r_{i_j}), \sigma r_{i_j}, \text{Value}(gv(t_{i_j})), \text{Value}(\text{CoNodes}(gv(t_{i_j}))), U_j>,$$

for $j \in \{1 \ldots k\}$. These constitute the values he was prepared to send the HSP anyway; however because he sent $<\text{Value}(r_1), t_1>, \ldots, <\text{Value}(r_s), t_s>$ in the first phase, he committed himself. Now, the HSP verifies the transmitted values as he normally would. If any of these checks fail, he will request the remainder and possibly penalize the FSP. If there is later a dispute that arises from one of $U_{j_1}, \ldots, U_{i_s}$, it can handled by the HSP directly. If, on the other hand, there is a dispute for another user, the HSP can then request the information regarding that user from the FSP. If the FSP cheated, then it will be caught now since it already committed to $r_1, \ldots, r_s$. On the other hand, if the FSP is honest, it will be able to produce the usage proof for the other user.

If there is a billing dispute in the sense that a user claims to be billed for more service than was utilized, then both the HSP and the FSP can provide a proof of the correct amount by presenting $<t, \text{Value}(r)\sigma_r, \text{Value}(gv(t)), \text{Value}(\text{CoNodes}(gv(t)))>$. If the root value computed utilizing $\text{Value}(gv(t))$ and $\text{Value}(\text{CoNodes}(gv(t)))$ matches $\text{Value}(r)$, and $\text{Vf}(Pk_U, \text{Value}(r), \sigma_r)=1$ then, it either follows that $\text{Value}(gv(t))$ was known to the FSP or the HSP, or that a collision was found in H. Assuming that H is collision resistant, it must be the case that the FSP or the HSP received $\text{Value}(gv(t))$. Since this value was secretly generated by the user and not revealed previously, it must be the case that the user transmitted it.

Micropayments Using Dense Hash

One may directly use dense hash trees in a micropayment scheme. For example, the customer can generate a dense hash tree, provide the root value to the HSP to be signed, also informing the HSP of the monetary value of (number of coins in) the tree. The HSP signs the root value and the monetary value, charges the customer's account, and transmits the signature back to the customer. The customer can then provide these coins to the FSP in the same way as in the microcredit scheme. The advantage of such a scheme over a hash-chain based scheme is that the computation required by the bank to validate coins sent by a merchant is only logarithmic in the number of coins spent, rather than linear. At the same time, the communication complexity between the merchant and user is constant, as is the time complexity of the work the merchant and user both have to do.

It is also possible, within embodiments of the present invention, to allow a single tree and signature to be used for multiple merchants. For example, the user can construct a tree with a number of dense hash subtrees, each of which corresponds to a different FSP. For a given FSP, microcredits involve hash pre-images coming from the given FSP's subtree.

If the user uses a conventional signature scheme, and the user's public signing key is certified in a normal fashion, then the user's transactions with the FSPs are not anonymous. To achieve some degree of anonymity between then user and the FSP, group signatures may be used. For example, the scheme described in G. Ateniese, J. Camenisch, M. Joye, and G. Tsudik, "A Practical and Provably Secure Coalition-Resistant Group Signature Scheme", In Proc. of CRYPTO 2000, may be used, which is the current state of the art. Then, each user the user registers with the HSP, who acts as a group manager, to establish its signing key. There may be separate classes of group public keys corresponding to different credit levels. When requesting service from the FSP, the user signs the root of a hash tree with its signing key. The FSP can check that the user is indeed in the group managed by the HSP, and that the HSP has given the user sufficient credit; so, it can accept microcredits from the user up to that amount. On the other hand, because a group signature scheme is used, the FSP will not know the user's identity. At bill reconciliation time, the FSP will, as usual, relay the user's signature to the HSP, who can then "open" the signature to determine the user's identity and charge the account accordingly.

If it is really desired, the customer can achieve anonymity even with respect to the HSP if the HSP signs the root value using a blind signature. With such a micro-payment scheme, the customer can then give these coins to an FSP without fear that the HSP and the FSP can collude to map transactions to customers.

However, in both cases, there is some degree of linkability between individual transactions in a given session since all the hash values are anchored to the root of the same tree. However, between sessions themselves, there is no linkability.

Variations on Dense Hash Trees

One can imagine slight variations on dense hash trees. For example, instead of having a binary tree, one can have a k-ary tree. We could not find any meaningful advantage to such an approach since the number of co-nodes for a vertex is proportional to the tree degree. Thus, for a k-ary tree, the $i^{th}$ grey vertex will have proof size $O(k \log_k(i))$. Another variation is to apply a different coloring of the vertices. In our case we colored every left child, however, we may instead pick a child arbitrarily and color it grey, while making its sibling white. One can extend our schemes to this setting. In a similar vein, we may want to consider a different numbering of the grey vertices. For example, if we number vertices depth first rather than breadth first, then FSP only has to cache at most $O(\log_2 m)$ values where m is the size of the tree. However, the disadvantage of this approach is that the deeper the vertex, the longer the associated proof, with the maximum proof size being $O(\log_2 m)$ for a leaf. By numbering breadth first, leaf vertices may not have to be present in a microcredit transaction.

The technique described herein is widely applicable to many scenarios involving the (especially electronic) provision of goods or services. For illustration, one such application is included here. For a network service provider, a potential problem is that a single customer may resell its bandwidth to multiple users, depriving the network service provider of these additional potential customers. To discourage bandwidth-reselling, the network service provider may prefer to bill its customers according to usage (rather than according to flat rates). The microcredit scheme described herein makes such an accounting approach feasible for the network service provider. To handle a customer's traffic, the network service provider may simply require the customer to include microcredits in its transmissions, which the network service provider can use in charging the customer's account. If such microcredits are required for usage, there is less incentive for a customer to try to resell its bandwidth, since it could make a profit only by reselling its bandwidth at a premium, and other users could avoid this premium by simply going to the network service provider directly. Since, as described above, the network service provider's memory and computation requirements are (for any given hash tree) only logarithmic in the number of microcredits spent, administering the microcredit scheme may add only a small amount of overhead to the network service provider's management of its network and customers, even though (especially if) the network service provider may be handling an enormous amount of traffic. This is in contrast to traditional approaches that use micropayment schemes, where the network service provider's computational requirements would grow linearly with the amount of traffic handled, making such an approach considerably less scalable.

An Exemplary Computer System

Figure 8:
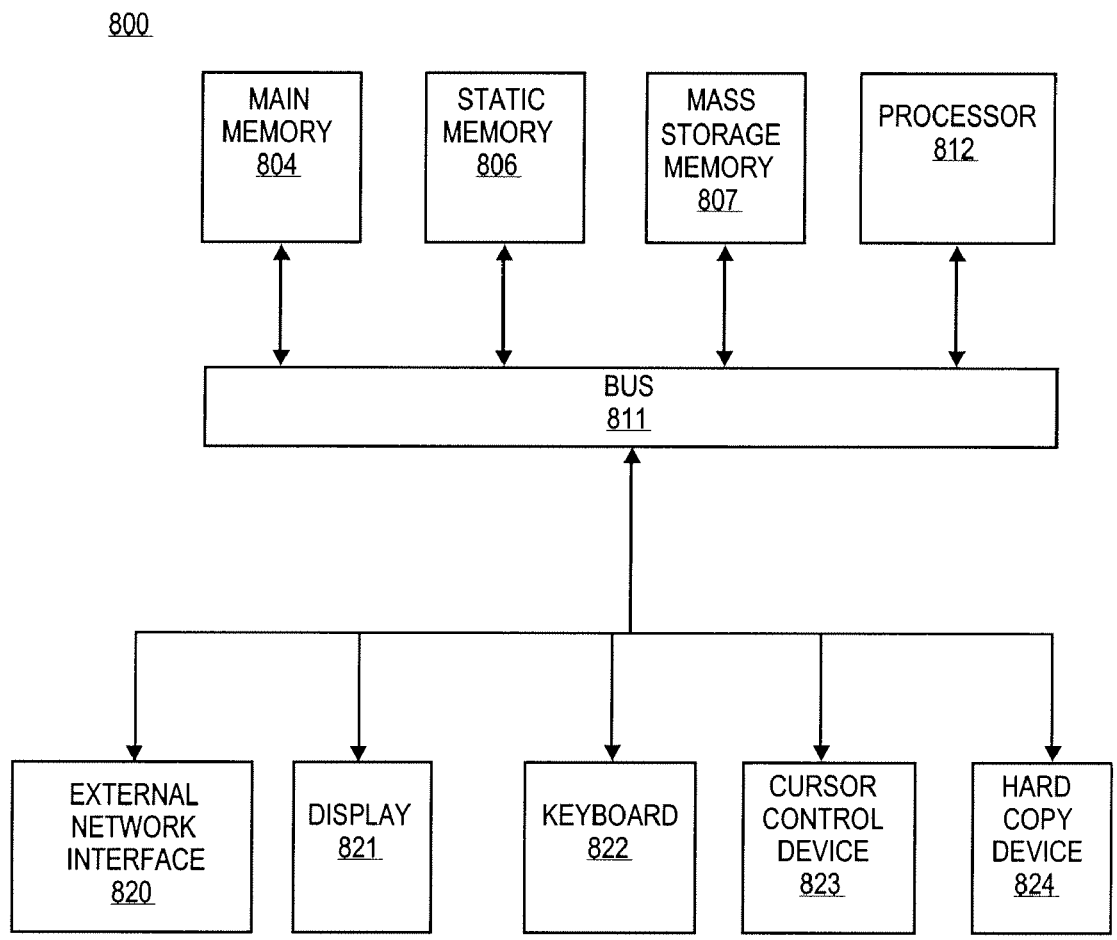
FIG. 8 is a block diagram of an exemplary computer system that may perform one or more of the operations described herein.

FIG. 8 is a block diagram of an exemplary computer system that may perform one or more of the operations described herein. Referring to FIG. 8, computer system 800 may comprise an exemplary client 850 or server 800 computer system. Computer system 800 comprises a communication mechanism or bus 811 for communicating information, and a processor 812 coupled with bus 811 for processing information. Processor 812 includes a microprocessor, but is not limited to a microprocessor, such as, for example, Pentium™, PowerPC™, Alpha™, etc.

System 800 further comprises a random access memory (RAM), or other dynamic storage device 804 (referred to as main memory) coupled to bus 811 for storing information and instructions to be executed by processor 812. Main memory 804 also may be used for storing temporary variables or other intermediate information during execution of instructions by processor 812.

Computer system 800 also comprises a read only memory (ROM) and/or other static storage device 806 coupled to bus 111 for storing static information and instructions for processor 812, and a data storage device 807, such as a magnetic disk or optical disk and its corresponding disk drive. Data storage device 807 is coupled to bus 811 for storing information and instructions.

Computer system 800 may further be coupled to a display device 821, such as a cathode ray tube (CRT) or liquid crystal display (LCD), coupled to bus 811 for displaying information to a computer user. An alphanumeric input device 822, including alphanumeric and other keys, may also be coupled to bus 811 for communicating information and command selections to processor 812. An additional user input device is cursor control 823, such as a mouse, trackball, trackpad, stylus, or cursor direction keys, coupled to bus 811 for communicating direction information and command selections to processor 812, and for controlling cursor movement on display 821.

Another device that may be coupled to bus 811 is hard copy device 824, which may be used for printing instructions, data, or other information on a medium such as paper, film, or similar types of media. Furthermore, a sound recording and playback device, such as a speaker and/or microphone may optionally be coupled to bus 811 for audio interfacing with computer system 800. Another device that may be coupled to bus 811 is a wired/wireless communication capability 825 to communication to a phone or handheld palm device.

In one embodiment, system 800 includes an external network interface 820 coupled to bus 811. This may include a network interface card (NIC).

Note that any or all of the components of system 800 and associated hardware may be used in the present invention. However, it can be appreciated that other configurations of the computer system may include some or all of the devices.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A computer-implemented method performed on a device comprising:
   requesting a desired service through a foreign service provider;
   generating a hash tree and generating a digital signature on a root value of the hash tree;
   sending the digital signature and the root value to the foreign service provider as a first packet;
   receiving data indicating that the service provider has verified the signature;
   providing one or more tokens to the foreign service provider with a next packet after the foreign service provider has verified the signature to use the service, wherein the one or more tokens are generated using the hash tree; and
   using the service while the foreign service provider accepts tokens.

2. The method of claim 1 wherein the hash tree is one selected from a group consisting of a Merkle tree and a dense hash tree.

3. The method of claim 1 further comprising generating the one or more tokens using a public key signature scheme, including using a public-key signature to sign the root of the hash tree.

4. The method of claim 1 further comprising generating a digital signature on the root of the tree using a private signing key.

5. The method of claim 1 wherein each of the one or more of the tokens includes one or more of a group consisting of the identity of the foreign service provider for which tokens are intended, a maximum number of tokens that the foreign service provider may receive, and any conditions that the foreign service provider must satisfy before it can redeem the token.

6. The method of claim 1 further comprising sending to the foreign service provider a signature on the root value of the hash tree, a public key of the user device and a certificate from a trusted party attesting to a relationship between the user and a home service provider produced from a private key of the home service provider.

7. The method of claim 1 wherein the one or more tokens is an undeniable token.

8. The method of claim 1 wherein generating the hash tree further comprises:
   generating a dense hash tree;
   providing the root value to a home service provider for signature; and
   transmitting data to the home service provider that informs the home service provider of a monetary value of the dense hash tree based on a number of tokens in the dense hash tree, wherein the monetary value of the dense hash tree enables the home service provider to make monetary payments to the foreign service provider based on the one or more tokens provided to the foreign service provider.

9. A computer-implemented method performed on a device comprising:
   requesting a desired service through a foreign service provider;
   generating a dense hash tree and generating a digital signature on a root value of the hash tree, wherein the dense hash tree is constructed by,
      randomly generating a number of bit streams equal to the number of tokens that is estimated to be needed,
      constructing a binary tree with a number of leaves equal to the number of estimated tokens plus one,
      assigning the random bit strings to the leaves, and
      computing values to be assigned to each internal node according to the values of children of internal nodes;
   sending the digital signature and the root value to the foreign service provider as a first packet;
   receiving data indicating that the service provider has verified the signature;
   providing one or more tokens to the foreign service provider with a next packet after the foreign service provider has verified the signature to use the service, wherein the one or more tokens are generated using the hash tree; and
   using the service while the foreign service provider accepts tokens.

10. The method defined in claim 9 wherein generating a number of bit streams comprises generating the number of bits streams from a single seed.

11. The method of claim 9 wherein the bit strings are of cryptographically suitable length.

12. An apparatus comprising:
   an external network interface through which a request for a desired service of a foreign service provider is made;
   a memory;
   a processor coupled to the external network interface and the memory, wherein the processor to generate a hash tree and generate a digital signature on a root value of the hash tree using the memory, and further wherein the processor to send the digital signature and the root value to the foreign service provider as a first packet, via the external network interface, along with one or more tokens with a next packet after the foreign service provider has verified the signature for use of the service, and use the service while the foreign service provider accepts tokens, wherein the one or more tokens are generated using the hash tree.

13. The apparatus of claim 12 further comprising a user device to generate the one or more tokens.

14. The apparatus of claim 13 wherein the user device to generate tokens using the hash tree.

15. The apparatus of claim 14 wherein the hash tree is one selected from a group consisting of a Merkle tree and a dense hash tree.

16. The apparatus of claim 12 wherein the processor to generate the one or more tokens using a public key signature scheme, including using a public-key signature to sign the root of the hash tree.

17. The apparatus of claim 12 wherein the processor includes in each of the one or more of the tokens one or more of a group consisting of the identity of the foreign service provider for which tokens are intended, a maximum number of tokens that the foreign service provider may receive, and any conditions that the foreign service provider must satisfy before it can redeem the token.

18. The apparatus of claim 12 wherein the processor causes a signature on the root value of the hash tree, a public key of the user device and a certificate from a trusted party attesting to a relationship between the user and a home service provider, produced from a private key of the home service provider, to the foreign service provider via the external network interface.

19. The apparatus of claim 12 wherein the token is an undeniable token.

20. The apparatus of claim 12 wherein to generate a hash tree, the processor provides a root value of a dense hash tree to a home service provider for signature and transmits data that informs the home service provider of a monetary value of the dense hash tree, based on a number of tokens in the dense hash tree, to enable the home service provider to make monetary payments to the foreign service provider for the service based on the one or more tokens sent to the foreign service provider.

21. An apparatus comprising:
means for requesting a desired service through a foreign service provider;
means for generating a hash tree and generating a digital signature on a root value of the hash tree;
means for sending the digital signature and the root value to the foreign service provider as a first packet;
means for receiving data indicating that the service provider has verified the signature;
means for providing one or more tokens to the foreign service provider with a next packet after the foreign service provider has verified the signature to use the service, wherein the one or more tokens are generated using the hash tree; and
means for using the service while the foreign service provider accepts tokens.

22. An article of manufacture having one or more recordable media storing instructions thereon which, when executed by a system, cause the system to perform a method comprising:
requesting a desired service through a foreign service provider;
generating a hash tree and generating a digital signature on a root value of the hash tree;
sending the digital signature and the root value to the foreign service provider as a first packet;
receiving data indicating that the service provider has verified the signature;
providing one or more tokens to the foreign service provider with a next packet after the foreign service provider has verified the signature to use the service, wherein the one or more tokens are generated using the hash tree; and
using the service while the foreign service provider accepts tokens.

* * * * *

UNITED STATES PATENT AND TRADEMARK OFFICE
CERTIFICATE OF CORRECTION

| | | |
|---|---|---|
| PATENT NO. | : 7,620,606 B2 | Page 1 of 1 |
| APPLICATION NO. | : 10/534943 | |
| DATED | : November 17, 2009 | |
| INVENTOR(S) | : Gentry et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1105 days.

Signed and Sealed this

Twenty-sixth Day of October, 2010

David J. Kappos
*Director of the United States Patent and Trademark Office*